(12) United States Patent
Stokes et al.

(10) Patent No.: US 10,687,098 B2
(45) Date of Patent: *Jun. 16, 2020

(54) METHODS AND APPARATUS FOR CREDITING A MEDIA PRESENTATION DEVICE

(71) Applicant: The Nielsen Company (US), LLC, New York, NY (US)

(72) Inventors: Robert Stokes, Palm Harbor, FL (US); Venugopal Srinivasan, Palm Harbor, FL (US); Arun Ramaswamy, Tampa, FL (US); Daniel Nelson, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,395

(22) Filed: Oct. 10, 2017

(65) Prior Publication Data

US 2018/0035141 A1 Feb. 1, 2018

Related U.S. Application Data

(63) Continuation of application No. 15/015,784, filed on Feb. 4, 2016, now Pat. No. 9,832,496, which is a
(Continued)

(51) Int. Cl.
*H04N 21/254* (2011.01)
*H04N 21/422* (2011.01)
(Continued)

(52) U.S. Cl.
CPC ............ *H04N 21/24* (2013.01); *H04H 60/32* (2013.01); *H04H 60/58* (2013.01);
(Continued)

(58) Field of Classification Search
None
See application file for complete search history.

(56) References Cited

U.S. PATENT DOCUMENTS 3,281,695 A 10/1966 Bass
3,315,160 A 4/1967 Goodman
(Continued)

FOREIGN PATENT DOCUMENTS

CN 1244982 2/2000
DE 3401762 8/1985
(Continued)

OTHER PUBLICATIONS

Thomas, William L., "Television Audience Research Technology, Today's Systems and Tomorrow's Challenges," Nielsen Media Research, Jun. 5, 1992 (4 pages).
(Continued)

*Primary Examiner* — Brian T Pendleton
*Assistant Examiner* — Jean D Saint Cyr
(74) *Attorney, Agent, or Firm* — Hanley, Flight & Zimmerman, LLC

(57) ABSTRACT

Methods and apparatus for crediting a media presentation device are disclosed. Example apparatus disclosed include a signal generator to compute a signature from audio obtained from a media device during a time period, and an on/off detector to determine an on/off state of the media device based on a gain level applied by an automatic gain controller during collection of the audio. Disclosed apparatus also include a location creditor to credit the media device with presenting media during the time period when the signature matches at least one of a set of reference signatures and the on/off state is determined as the on state or as the off state, the location creditor not to credit the media device with presenting the media when the signature does not match at
(Continued)

least one of the set of reference signatures and the on/off state is determined as the off state.

18 Claims, 8 Drawing Sheets

Related U.S. Application Data continuation of application No. 13/718,878, filed on Dec. 18, 2012, now Pat. No. 9,473,795.

(60) Provisional application No. 61/577,467, filed on Dec. 19, 2011.

(51) Int. Cl.
*H04N 21/439* (2011.01)
*H04N 21/442* (2011.01)
*H04N 21/478* (2011.01)
*H04N 21/8358* (2011.01)
*H04N 21/24* (2011.01)
*H04H 60/32* (2008.01)
*H04H 60/58* (2008.01)
*H04N 21/233* (2011.01)
*H04N 21/658* (2011.01)

(52) U.S. Cl.
CPC ....... *H04N 21/233* (2013.01); *H04N 21/2407* (2013.01); *H04N 21/254* (2013.01); *H04N 21/42203* (2013.01); *H04N 21/4394* (2013.01); *H04N 21/6582* (2013.01)

(56) References Cited

U.S. PATENT DOCUMENTS

| | | | |
|---|---|---|---|
| 3,483,327 A | 12/1969 | Schwartz | |
| 3,651,471 A | 3/1972 | Haselwood et al. | |
| 3,733,430 A | 5/1973 | Thompson et al. | |
| 3,803,349 A | 4/1974 | Watanabe | |
| 3,906,454 A | 9/1975 | Martin | |
| 3,947,624 A | 3/1976 | Miyake | |
| 4,027,332 A | 5/1977 | Wu et al. | |
| 4,044,376 A | 8/1977 | Porter | |
| 4,058,829 A | 11/1977 | Thompson | |
| 4,245,245 A | 1/1981 | Matsumoto et al. | |
| 4,388,644 A | 6/1983 | Ishman et al. | |
| 4,546,382 A | 10/1985 | McKenna et al. | |
| 4,566,030 A | 1/1986 | Nickerson et al. | |
| 4,574,304 A | 3/1986 | Watanabe et al. | |
| 4,613,904 A | 9/1986 | Lurie | |
| 4,622,583 A | 11/1986 | Watanabe et al. | |
| 4,642,685 A | 2/1987 | Roberts et al. | |
| 4,644,393 A | 2/1987 | Smith et al. | |
| 4,647,964 A | 3/1987 | Weinblatt | |
| 4,697,209 A | 9/1987 | Kiewit et al. | |
| 4,723,302 A | 2/1988 | Fulmer et al. | |
| 4,764,808 A | 8/1988 | Solar | |
| 4,769,697 A | 9/1988 | Gilley et al. | |
| 4,779,198 A | 10/1988 | Lurie | |
| 4,800,437 A | 1/1989 | Hosoya | |
| 4,807,031 A | 2/1989 | Broughton et al. | |
| 4,876,736 A | 10/1989 | Kiewit | |
| 4,885,632 A | 12/1989 | Mabey et al. | |
| 4,907,079 A | 3/1990 | Turner et al. | |
| 4,912,552 A | 3/1990 | Allison, III et al. | |
| 4,931,865 A | 6/1990 | Scarampi | |
| 4,943,963 A | 7/1990 | Waechter et al. | |
| 4,965,825 A | 10/1990 | Harvey et al. | |
| 4,972,503 A | 11/1990 | Zurlinden | |
| 5,097,328 A | 3/1992 | Boyette | |
| 5,136,644 A | 8/1992 | Audebert et al. | |
| 5,165,069 A | 11/1992 | Vitt et al. | |
| 5,226,177 A | 7/1993 | Nickerson | |
| 5,235,414 A | 8/1993 | Cohen | |
| 5,251,324 A | 10/1993 | McMullan, Jr. | |
| 5,310,222 A | 5/1994 | Chatwin et al. | |
| 5,319,453 A | 6/1994 | Copriviza et al. | |
| 5,335,277 A | 8/1994 | Harvey et al. | |
| 5,355,161 A | 10/1994 | Bird et al. | |
| 5,398,055 A | 3/1995 | Nonomura et al. | |
| 5,404,161 A | 4/1995 | Douglass et al. | |
| 5,404,172 A | 4/1995 | Berman et al. | |
| 5,408,258 A | 4/1995 | Kolessar | |
| 5,425,100 A | 6/1995 | Thomas et al. | |
| 5,481,294 A | 1/1996 | Thomas et al. | |
| 5,483,276 A | 1/1996 | Brooks et al. | |
| 5,488,408 A | 1/1996 | Maduzia et al. | |
| 5,505,901 A | 4/1996 | Harvey et al. | |
| 5,512,933 A | 4/1996 | Wheatley et al. | |
| 5,550,928 A | 8/1996 | Lu et al. | |
| 5,659,367 A | 8/1997 | Yuen | |
| 5,760,760 A | 6/1998 | Helms | |
| 5,767,922 A | 6/1998 | Zabih et al. | |
| 5,771,307 A | 6/1998 | Lu et al. | |
| 5,801,747 A | 9/1998 | Bedard | |
| 5,874,724 A | 2/1999 | Cato | |
| 5,896,554 A | 4/1999 | Itoh et al. | |
| 5,889,548 A | 5/1999 | Chan | |
| 5,963,844 A | 10/1999 | Dail | |
| 6,035,177 A | 3/2000 | Moses et al. | |
| 6,049,286 A | 4/2000 | Forr | |
| 6,124,877 A | 9/2000 | Schmidt | |
| 6,137,539 A | 10/2000 | Lownes et al. | |
| 6,177,931 B1 | 1/2001 | Alexander et al. | |
| 6,184,918 B1 | 2/2001 | Goldschmidt Iki et al. | |
| 6,272,176 B1 | 8/2001 | Srinivasan | |
| 6,286,140 B1 | 9/2001 | Ivanyi | |
| 6,297,859 B1 | 10/2001 | George | |
| 6,311,214 B1 | 10/2001 | Rhoads | |
| 6,388,662 B2 | 5/2002 | Narui et al. | |
| 6,400,996 B1 | 6/2002 | Hoffberg et al. | |
| 6,421,445 B1 | 7/2002 | Jensen et al. | |
| 6,457,010 B1 | 9/2002 | Eldering et al. | |
| 6,463,413 B1 | 10/2002 | Applebaum et al. | |
| 6,467,089 B1 | 10/2002 | Aust et al. | |
| 6,477,508 B1 | 11/2002 | Lazar et al. | |
| 6,487,719 B1 | 11/2002 | Itoh et al. | |
| 6,519,769 B1 | 2/2003 | Hopple et al. | |
| 6,523,175 B1 | 2/2003 | Chan | |
| 6,529,212 B2 | 3/2003 | Miller et al. | |
| 6,542,878 B1 | 4/2003 | Heckerman et al. | |
| 6,567,978 B1 | 5/2003 | Jarrell | |
| 6,570,559 B1 | 5/2003 | Oshima | |
| 6,647,212 B1 | 11/2003 | Toriumi et al. | |
| 6,647,548 B1 | 11/2003 | Lu et al. | |
| 6,675,383 B1 | 1/2004 | Wheeler et al. | |
| 6,681,396 B1 | 1/2004 | Bates et al. | |
| 6,791,472 B1 | 9/2004 | Hoffberg | |
| 6,934,508 B2 | 8/2005 | Ceresoli et al. | |
| 6,946,803 B2 | 9/2005 | Moore | |
| 7,051,352 B1 | 5/2006 | Schaffer | |
| 7,100,181 B2 | 8/2006 | Srinivasan et al. | |
| 7,150,030 B1 | 12/2006 | Eldering et al. | |
| 7,647,604 B2 | 1/2010 | Ramaswamy | |
| 7,786,987 B2 | 8/2010 | Nielsen | |
| 7,882,514 B2 | 2/2011 | Nielsen et al. | |
| 7,958,526 B2 | 6/2011 | Wheeler et al. | |
| 8,060,372 B2 | 11/2011 | Topchy et al. | |
| 8,180,712 B2 | 5/2012 | Nelson et al. | |
| 8,249,992 B2 | 8/2012 | Harkness et al. | |
| 8,526,626 B2 | 9/2013 | Nielsen et al. | |
| 8,863,166 B2 | 10/2014 | Harsh et al. | |
| 9,312,973 B2 | 4/2016 | Nelson et al. | |
| 9,332,305 B1 | 5/2016 | Lee | |
| 9,420,334 B2 | 8/2016 | Nielsen et al. | |
| 9,680,584 B2 | 6/2017 | Lee | |
| 9,961,342 B2 | 5/2018 | Nielsen et al. | |
| 10,110,889 B2 | 10/2018 | Nielsen et al. | |
| 10,306,221 B2 | 5/2019 | Nielsen et al. | |
| 10,506,226 B2 | 12/2019 | Nielsen et al. | |
| 2002/0012353 A1 | 1/2002 | Gerszberg et al. | |
| 2002/0015112 A1 | 2/2002 | Nagakubo et al. | |
| 2002/0026635 A1 | 2/2002 | Wheeler et al. | |

(56) References Cited

U.S. PATENT DOCUMENTS

| | | |
|---|---|---|
| 2002/0056087 A1 | 5/2002 | Berezowski et al. |
| 2002/0057893 A1 | 5/2002 | Wood et al. |
| 2002/0059577 A1 | 5/2002 | Lu et al. |
| 2002/0072952 A1 | 6/2002 | Hamzy et al. |
| 2002/0077880 A1 | 6/2002 | Gordon et al. |
| 2002/0080286 A1 | 6/2002 | Dagtas et al. |
| 2002/0083435 A1 | 6/2002 | Blasko et al. |
| 2002/0141730 A1 | 10/2002 | Haken |
| 2002/0174425 A1 | 11/2002 | Markel et al. |
| 2002/0198762 A1 | 12/2002 | Donato |
| 2003/0046685 A1 | 3/2003 | Srinivasan et al. |
| 2003/0054757 A1 | 3/2003 | Kolessar et al. |
| 2003/0056215 A1 | 3/2003 | Kanungo |
| 2003/0067459 A1 | 4/2003 | Lim |
| 2003/0093790 A1 | 5/2003 | Logan et al. |
| 2003/0101449 A1 | 5/2003 | Bentollia et al. |
| 2003/0110485 A1 | 6/2003 | Lu et al. |
| 2003/0115591 A1 | 6/2003 | Weissmueller et al. |
| 2003/0131350 A1 | 7/2003 | Peiffer et al. |
| 2003/0216120 A1 | 11/2003 | Ceresoli et al. |
| 2004/0003394 A1 | 1/2004 | Ramaswamy |
| 2004/0055020 A1 | 3/2004 | Delpuch |
| 2004/0058675 A1 | 3/2004 | Lu et al. |
| 2004/0073918 A1 | 4/2004 | Ferman et al. |
| 2004/0088212 A1 | 5/2004 | Hill |
| 2004/0088721 A1 | 5/2004 | Wheeler et al. |
| 2004/0100437 A1 | 5/2004 | Hunter et al. |
| 2004/0181799 A1 | 9/2004 | Lu et al. |
| 2004/0210922 A1 | 10/2004 | Peiffer et al. |
| 2004/0233126 A1 | 11/2004 | Moore |
| 2005/0054285 A1 | 3/2005 | Mears et al. |
| 2005/0057550 A1 | 3/2005 | George |
| 2005/0125820 A1 | 6/2005 | Nelson et al. |
| 2005/0221774 A1 | 10/2005 | Ceresoli et al. |
| 2005/0286860 A1 | 12/2005 | Conklin |
| 2006/0075421 A1 | 4/2006 | Roberts et al. |
| 2006/0093998 A1 | 5/2006 | Vertegaal |
| 2006/0195857 A1 | 8/2006 | Wheeler et al. |
| 2006/0212895 A1 | 9/2006 | Johnson |
| 2006/0232575 A1 | 10/2006 | Nielsen |
| 2007/0011040 A1* | 1/2007 | Wright .................. G06Q 30/02 725/46 |
| 2007/0050832 A1 | 3/2007 | Wright et al. |
| 2007/0063850 A1 | 3/2007 | Devaul et al. |
| 2007/0186228 A1 | 8/2007 | Ramaswamy et al. |
| 2007/0192782 A1 | 8/2007 | Ramaswamy |
| 2008/0028427 A1 | 1/2008 | Nesvadba et al. |
| 2008/0148307 A1 | 6/2008 | Nielsen et al. |
| 2008/0148309 A1 | 6/2008 | Wilcox et al. |
| 2008/0276265 A1 | 11/2008 | Topchy et al. |
| 2009/0192805 A1 | 7/2009 | Topchy et al. |
| 2009/0225994 A1 | 9/2009 | Topchy et al. |
| 2009/0259325 A1 | 10/2009 | Topchy et al. |
| 2009/0305677 A1* | 12/2009 | Ellison .................. H04H 60/13 455/414.1 |
| 2010/0083299 A1* | 4/2010 | Nelson .................. H04H 60/32 725/19 |
| 2010/0162285 A1 | 6/2010 | Cohen et al. |
| 2010/0211967 A1 | 8/2010 | Ramaswamy et al. |
| 2011/0016231 A1 | 1/2011 | Ramaswamy et al. |
| 2012/0102515 A1 | 4/2012 | Ramaswamy |
| 2013/0084056 A1 | 4/2013 | Harsh et al. |
| 2013/0160042 A1 | 6/2013 | Stokes et al. |
| 2014/0059579 A1 | 2/2014 | Vinson et al. |
| 2016/0173921 A1 | 6/2016 | Stokes et al. |
| 2016/0210557 A1 | 7/2016 | Nelson et al. |
| 2016/0323571 A1 | 11/2016 | Nielsen et al. |
| 2018/0241989 A1 | 8/2018 | Nielsen et al. |

FOREIGN PATENT DOCUMENTS

| | | |
|---|---|---|
| EP | 0593202 | 4/1994 |
| EP | 0946012 | 9/1999 |
| EP | 1318679 | 6/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 9526106 | 9/1995 |
| WO | 9810539 | 3/1998 |
| WO | 9832251 | 7/1998 |
| WO | 9933206 | 7/1999 |
| WO | 9959275 | 11/1999 |
| WO | 0038360 | 6/2000 |
| WO | 0072484 | 11/2000 |
| WO | 0111506 | 2/2001 |
| WO | 0145103 | 6/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03060630 | 7/2003 |
| WO | 2005032145 | 4/2005 |
| WO | 2005038625 | 4/2005 |
| WO | 2005041166 | 5/2005 |
| WO | 2005055601 | 6/2005 |
| WO | 05065159 | 7/2005 |
| WO | 05079457 | 9/2005 |
| WO | 2005079457 | 9/2005 |
| WO | 2006012629 | 2/2006 |
| WO | 2007022250 | 2/2007 |
| WO | 07120518 | 10/2007 |
| WO | 2011115945 | 9/2011 |
| WO | 2015255256 | 8/2017 |

OTHER PUBLICATIONS

Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).

Elkan, Charles, "Naive Bayesian Learning," Adapted from Technical Report No. CS97-557, Department of Computer Science and Engineering, University of California, San Diego, U.S.A., Sep. 1997 (4 pages).

Zhang, Harry, "The Optimality of Naive Bayes," Proceedings of the Seventeenth International FLAIRS Conference, 2004 (6 pages).

Domingos et al., "On the Optimality of the Simple Bayesian Classifier under Zero-One Loss," Machine Learning, vol. 29, No. 2, pp. 103-130, Nov. 1, 1997 (28 pages).

Patron-Perez et al., "A Probabilistic Framework for Recognizing Similar Actions using Spatio-Temporal Features," BMVC07, 2007 [Retrieved from the Internet on Feb. 29, 2008] (10 pages).

Mitchell, Tom M., "Chapter 1; Generative and Discriminative Classifiers: Naive Bayes and Logistic Regression," Machine Learning, Sep. 21, 2006 (17 pages).

Lang, Marcus, "Implementation on Naive Bayesian Classifiers in Java," http://www.iit.edul~ipro356f03/ipro/documents/naive-bayes.edu [Retrieved from the Internet on Feb. 29, 2008] (4 pages).

Liang et al., "Learning Naive Bayes Tree for Conditional Probability Estimation," Proceedings of the Canadian A1-2006 Conference, held in Quebec, Canada, pp. 456-466, on Jun. 7-9, 2006 (13 pages).

Mozina et al., "Nomograms for Visualization of Naive Bayesian Classifier," Proceedings of the Eight European Conference on Principles and Practice of Knowledge Discovery in Databases, held in Pisa, Italy, pp. 337-348, 2004 [Retrieved from the Internet on Feb. 29, 2008] (12 pages).

"Lecture 3; Naive Bayes Classification," http://www.cs.utoronto.ca/~strider/CSCD 11_f08INaiveBayes_Zemel.pdf [Retrieved from the Internet on Feb. 29, 2008] (9 pages).

Klein, Dan, PowerPoint Presentation of "Lecture 23: Naive Bayes," CS 188: Artificial Intelligence held on Nov. 15, 2007 (6 pages).

Lu et al., "Content Analysis for Audio Classification and Segmentation," IEEE Transactions on Speech and Audio Processing, vol. 10, No. 7, Oct. 2002 (14 pages).

(56) References Cited

OTHER PUBLICATIONS

IP Australia, "Examination Report," issued in connection with Australian Patent Application No. 2010219320, dated Jun. 20, 2012 (4 pages).
EPO, "Extended European Search Report," issued in connection with European Patent Application No. 06801611.2, dated Mar. 2, 2012 (5 pages).
EPO, "Examination Report," issued in connection with European Patent Application No. 06801611.2, dated Jun. 25, 2013 (4 pages).
United States Patent and Trademark Office, "Non-Final Office Action", issued in connection with U.S. Appl. No. 12/831,870, dated Nov. 29, 2012 (9 pages).
United States Patent and Trademark Office, "Notice of Allowance", issued in U.S. Appl. No. 12/831,870, dated Apr. 23, 2013 (9 pages).
United States Patent and Trademark Office, "Notice of Allowance", issued in U.S. Appl. No. 12/831,870, dated Aug. 1, 2013 (6 pages).
IP Australia, "Examination Report", issued in connection with Australian Patent Application No. 2013203468, dated Aug. 26, 2014 (3 pages).
IP Australia, "Notice of Acceptance", issued in connection with Australian Patent Application No. 2013203468, dated Oct. 1, 2015 (2 pages).
Canadian Intellectual Property Office, "Office Action", issued in connection with Canadian Patent Application No. 2,619,781, dated Sep. 12, 2013 (3 pages).
Canadian Intellectual Property Office, "Office Action", issued in connection with Canadian Patent Application No. 2,619,781, dated Jan. 26, 2015 (4 pages).
Canadian Intellectual Property Office, "Office Action," issued in connection with Canadian Patent Application No. 2,619,781, dated Apr. 1, 2016 (8 pages).
United States Patent and Trademark Office, "Non-Final Office Action," issued in connection with U.S. Appl. No. 14/015,664, dated Jan. 4, 2016 (6 pages).
United States Patent and Trademark Office, "Notice of Allowance," issued in connection with U.S. Appl. No. 14/015,664, dated Apr. 20, 2016 (10 pages).
United States Patent and Trademark Office, "Notice of Allowability," issued in connection with U.S. Appl. No. 14/015,664, dated Jul. 20, 2016 (2 pages).
Canadian Intellectual Property Office, "Notice of Allowance", issued in connection with Canadian Patent Application No. 2,619,781, dated Apr. 10, 2017 (1 page).
United States Patent and Trademark Office, "Non-Final Office Action," issued in connection with U.S. Appl. No. 15/207,019, dated Apr. 19, 2017 (6 pages).
Canadian Intellectual Property Office, "Office Action," issued in connection with Application No. 2,859,560, dated Nov. 3, 2015, 5 pages.
IP Australia, "Notice of Acceptance," issued in connection with Application No. 2012327192, dated Jul. 29, 2015, 2 pages.
European Patent Office, "Extended European Search Report," issued in connection with Application No. 12859707.7, dated Jul. 6, 2015, 7 pages.
Doe, "Bringing Set Top Box Data to Life," ARF Audience Measurement Symposium 2.0, NYC, Jun. 26, 2007, 9 pages.
IP Australia, "Patent Examination Report No. 1 ," issued in connection with Application No. 2012327192, dated Aug. 6, 2014, 3 pages.
European Patent Office, "Communication pursuant to Rules 161(2) and 162 EPC," issued in connection with Application No. 12859707.7, dated Aug. 1, 2014, 3 pages.
Patent Cooperation Treaty, "International Preliminary Report on Patentability," issued in connection with Application No. PCT/US2012/070362, dated Jun. 24, 2014, 9 pages.
International Search Report and Written Opinion, issued by the International Searching Authority in connection with International application No. PCT/US2012/070362, dated Apr. 30, 2013, 11 pages.
United States Patent and Trademark Office, "Requirement for Restriction/Election," issued in connection with U.S. Appl. No. 13/718,878, dated Mar. 13, 2014, 6 pages.
United States Patent and Trademark Office, "Non-Final Office Action," issued in connection with U.S. Appl. No. 13/718,878, dated Jul. 14, 2014, 30 pages.
United States Patent and Trademark Office, "Final Office Action," issued in connection with U.S. Appl. No. 13/718,878, dated Jan. 6, 2015, 32 pages.
United States Patent and Trademark Office, "Notice of Allowance" issued in connection with U.S. Appl. No. 13/718,878, dated Sep. 25, 2015, 49 pages.
State Intellectual Property Office of the People's Republic of China, "Office Action," issued in connection with Chinese Patent Application No. 201280070000.8, dated Oct. 21, 2016, 7 pages.
United States Patent and Trademark Office, "Final Office Action," issued in connection with U.S. Appl. No. 15/207,019, dated Sep. 6, 2017, 9 pages.
IP Australia, "Notice of Acceptance," issued in connection with Australian Patent Application No. 2015255256, dated Apr. 13, 2017, 3 pages.
IP Australia, "Patent Examination Report No. 1," issued in connection with Australian Patent Application No. 2015255256, dated Nov. 11, 2016, 2 pages.
United States Patent and Trademark Office, "Non-Final Office Action," issued in connection with U.S. Appl. No. 15/015,784, dated Sep. 9, 2016, 39 pages.
United States Patent and Trademark Office, "Notice of Allowance," issued in connection with U.S. Appl. No. 15/015,784, dated Apr. 17, 2017, 26 pages.
United States Patent and Trademark Office, "Notice of Allowance," issued in connection with U.S. Appl. No. 15/015,784, dated Jul. 12, 2017, 37 pages.
United States Patent and Trademark Office, "Non-Final Office Action," issued in connection with U.S. Appl. No. 11/576,328, dated Feb. 5, 2009, 13 pages.
United States Patent and Trademark Office, "Non-Final Office Action," issued in connection with U.S. Appl. No. 11/576,328, dated Aug. 7, 2009, 10 pages.
United States Patent and Trademark Office, "Notice of Allowance," issued in connection with U.S. Appl. No. 15/958,814, dated Jun. 15, 2018, 9 pages.
United States Patent and Trademark Office, "Notice of Allowance," issued in connection with U.S. Appl. No. 16/417,128, dated Jul. 29, 2019, 12 pages.
United States Patent and Trademark Office, "Corrected Notice of Allowability," issued in connection with U.S. Appl. No. 16/417,128, dated Oct. 8, 2019, 2 pages.

\* cited by examiner

METHODS AND APPARATUS FOR CREDITING A MEDIA PRESENTATION DEVICE

This patent arises from a continuation of U.S. patent application Ser. No. 15/015,784, now U.S. Pat. No. 9,832,496, which was filed on Feb. 4, 2016, and is entitled "Methods and Apparatus for Crediting a Media Presentation Device," which is a continuation of U.S. patent application Ser. No. 13/718,878, now U.S. Pat. No. 9,473,795, which was filed on Dec. 18, 2012, and is entitled "Methods and Apparatus for Crediting a Media Presentation Device," which claims the benefit of and priority to U.S. Provisional Patent Application No. 61/577,467, filed Dec. 19, 2011. U.S. patent application Ser. No. 15/015,784, U.S. patent application Ser. No. 13/718,878 and U.S. Provisional Patent Application No. 61/577,467 are hereby incorporated herein by reference in their respective entireties.

FIELD OF THE DISCLOSURE

The present disclosure relates generally to audience measurement and, more particularly, to methods and apparatus for crediting a media presentation device.

BACKGROUND

Media ratings and other audience metering information are typically generated by collecting media exposure information from a group of statistically selected households. Each of the statistically selected households, also called metered households, typically has a data logging and processing unit commonly referred to as a "home unit," "meter" or "audience measurement device." In metered households or, more generally, metering sites having multiple media presentation devices, the data logging and processing functionality may be distributed among a single home unit and multiple site units, where one site unit may be provided for each media presentation device or media presentation area and provides data to the home unit for processing and/or communicating to a central processing site. The home unit (or the combination of the home unit and the site units) includes sensors to gather data from the monitored media presentation devices (e.g., audio-video (AV) devices) at the selected site.

DETAILED DESCRIPTION

Figure 1:
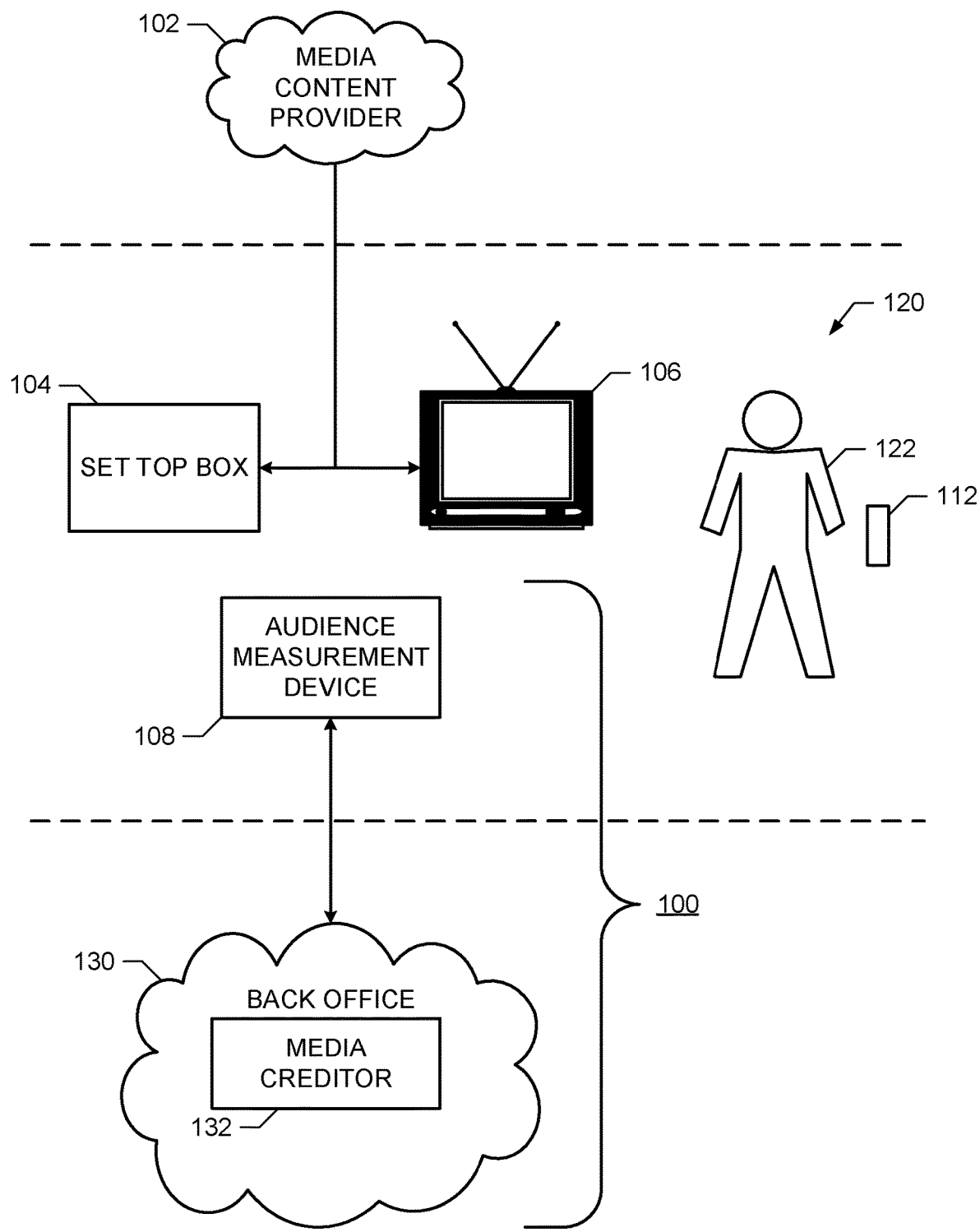
FIG. 1 is a block diagram of an example media monitoring system constructed in accordance with the teachings of this disclosure to credit media presentation to a media presentation device.

Certain examples are shown in the above-identified figures and described in detail below. In describing these examples, like or identical reference numbers are used to identify common or similar elements. Although the example systems and apparatus described herein include, among other components, software executed on hardware, such systems and apparatus is merely illustrative and should not be considered as limiting. Any or all of the disclosed components could be embodied exclusively in hardware, exclusively in software, exclusively in firmware or in some combination of hardware, firmware or software.

Metering data providing an accurate representation of the exposure to media content of persons in metered households is useful in generating media ratings of value to advertisers and/or producers of media content. Generating accurate metering data has become difficult as the media presentation devices have become more complex in functionality and interoperability.

Some existing methods for crediting metered environments with media exposure include connecting a metering device to a media presentation device (e.g., a television) in the metered environment and/or to sources of media (e.g., set top boxes, game consoles, etc.). Connecting and configuring the metering devices can be costly and time-consuming. Other existing methods include equipping each person in a metered environment with a personal meter to capture audio codes from ambient sounds. Personal meters are prone to being left in a different location than the associated person, and can result in inaccurate measurements. Still other existing methods include obtaining set top box data from multi-system operators, such as cable and/or satellite delivery systems. However, such information may be proprietary and/or may result in skewed data due to the differing characteristics of the customers of each type of delivery system. For example, customers of cable providers are statistically likely to watch different types of shows than customers of satellite providers. Extrapolating set top box data (or equivalent data) from multi-system operators to a general population may result in inaccurate measurements.

Furthermore, the previously-known technologies to detect the on state or the off state of a media presentation device, as discussed above, are complex to set up by a person without additional training (e.g., in locating the additional sensors properly to obtain a signal) and/or are expensive to build and/or transport (e.g., because additional components add cost and weight), which may reduce the number of participants capable of being included in a metering project. Acquiring data from other sources (e.g., purchasing set top box data from a multi-system operator) may be prohibitively expensive and/or statistically misrepresentative.

Against this backdrop, methods, apparatus, and articles of manufacture to capture data regarding media exposure (e.g., television viewing habits of person(s) in metered households) and to credit metered locations and/or devices with media presentation, exposure, and/or consumption are disclosed herein.

One example method of crediting media content as being presented by a media presentation device includes capturing ambient audio from the location of the media presentation device and, based on the ambient audio: 1) identifying information encoded in the ambient audio (e.g., watermarks, codes, etc.), 2) generating signatures of the ambient audio for comparison with signatures of known media, and/or 3) determining whether the media presentation device is in an on state or an off state based on the ambient audio). In some examples, the recognition of embedded code(s) during a time period overrides a determination that the media presentation device is in an off state during the same time period, and enables the media presentation device to be credited with the media corresponding to the embedded code(s).

As used herein, media may refer to any type of audio and/or visual media including, but not limited to, television programs, advertisements, movies, video games, time-shifted programs, on-demand programs, and/or any other type of audio and/or video content and/or non-content media. Furthermore, the term media may refer to portions of and/or the entireties of such audio and/or visual media.

Example methods disclosed herein include obtaining ambient audio for a time period from a location including a media presentation device, detecting encoded information present in the ambient audio, crediting a first portion of the time period for the media presentation device to first media based on the encoded information, determining an on/off state of the media presentation device for a second portion of the time period different than the first portion based on the ambient audio, and crediting the second portion of the time period based on the on/off state of the media presentation device.

Some example methods further include computing a signature of the ambient audio corresponding to a third portion of the time period different from the first and second portions and crediting the third portion of the time period to the first media or to second media based on the signature. Some such example methods further include comparing the signature to a second signature, wherein crediting the third portion of the time period to the first media or to second media is based on the comparison. In some such examples, crediting the first portion based on the encoded information is performed before crediting the third portion based on the signature, and crediting the third portion is performed prior to crediting the second portion based on the on/off state of the media presentation device. In some such example methods, crediting the third portion based on the signature comprises overriding a determination that the media presentation device is in an off state during the third portion with a determination that the media presentation device is in an on state based on a comparison of the signature to a reference signature.

In some examples, crediting the second portion comprising assigning an off state to the second portion. In some example methods, crediting the first portion comprises overriding a determination that the media presentation device is in an off state during the first portion with a determination that the media presentation device is in an on state based on detecting the encoded information. In some example methods, obtaining the ambient audio comprises recording the ambient audio at the location.

In some examples, obtaining the ambient audio comprises receiving a data file including the ambient audio. In some example methods, detecting the encoded information comprises extracting a steganographically encoded watermark. In some examples, determining the on/off state of the audience measurement device is based only on the ambient audio.

Example apparatus disclosed herein include a code detector, an on/off detector, and a location creditor. The example code detector detects encoded information present in ambient audio collected from a monitored location. The example on/off detector determines a first portion of a time period during which a media presentation device in the monitored location is in an on state and determines a second portion of the time period during which the media presentation device is in an off state based on the ambient audio. The example location creditor credits a third portion of the time period for the media presentation device to first media based on the encoded information and credits a fourth portion of the time period different from the third portion based on the on state or the off state of the media presentation device during the fourth portion of the time period.

Some example apparatus further include a microphone to collect the ambient audio in the location including the media presentation device during a time period. Some example apparatus further include a network interface to receive the ambient audio via a network. Some example apparatus further include a signature generator to generate a signature of a portion of the ambient audio, the location creditor to credit a fifth portion of the time period based on the signature. In some such examples, the location creditor credits the third portion based on the encoded information prior to crediting the fifth portion based on the signature and credits the fifth portion prior to crediting the fourth portion based on the on state or the off state of the media presentation device.

Some other example methods disclosed herein include obtaining encoded information extracted from ambient audio, the ambient audio being recorded during a time period in a location including a media presentation device, crediting a first portion of the time period for the media presentation device to first media based on the encoded information, obtaining an on/off state of the media presentation device for a second portion of the time period different than the first portion, the on/off state being based on the ambient audio, and crediting the second portion of the time period based on the on/off state of the media presentation device.

In some examples, obtaining the encoded information includes receiving the encoded information in a data file from an audience measurement device located in the location. Some example methods further include obtaining a characterization of the ambient audio corresponding to a third portion of the time period different from the first and second portions, and crediting the third portion of the time period to the first media or to second media based on the signature. In some such example methods, obtaining the characterization comprises receiving a digital signature in the data file from an audience measurement device located in the location.

Some disclosed example apparatus include a processor and a memory storing computer readable instructions. When executed, the computer readable instructions cause the processor to access encoded information extracted from ambient audio, the ambient audio being recorded during a time period in a location including a media presentation device, credit a first portion of the time period for the media presentation device to first media based on the encoded information, access an on/off state of the media presentation device for a second portion of the time period different than the first portion, the on/off state being based on the ambient audio, and credit the second portion of the time period based on the on/off state of the media presentation device.

In some such example apparatus, the instructions are to cause the processor to access the encoded information in a data file received from an audience measurement device located in the location. In some examples, the instructions further cause the processor to access a characterization of the ambient audio corresponding to a third portion of the time period different from the first and second portions and credit the third portion of the time period to the first media or to second media based on the signature. In some such examples, the instructions are to cause the processor to access a digital signature in a data file received from an audience measurement device located in the location.

Some disclosed example methods include obtaining ambient audio for a time period from a location including a media presentation device, computing a signature of the ambient audio, crediting a first portion of the time period for the media presentation device to first media based on the signature, determining an on/off state of the media presentation device for a second portion of the time period different than the first portion based on the ambient audio, and crediting the second portion of the time period based on the on/off state of the media presentation device. Some example methods further include comparing the signature to a second signature, wherein crediting the first portion of the time period to the first media is based on the comparison.

Some disclosed example apparatus include a signature generator, an on/off detector, and a location creditor. The example signature generator computes a signature of ambient audio collected from a monitored location. The on/off detector determines a first portion of a time period during which a media presentation device in the monitored location is in an on state and determines a second portion of the time period during which the media presentation device is in an off state based on the ambient audio. The example location creditor credits a third portion of the time period for the media presentation device to first media based on the signature and credits a fourth portion of the time period different from the third portion based on the on state or the off state of the media presentation device during the fourth portion of the time period. In some such example apparatus the location creditor compares the signature to a reference signature associated with the first media, wherein crediting the third portion of the time period is based on the comparison.

Some disclosed example methods include obtaining a characterization of ambient audio, the ambient audio being recorded during a time period in a location including a media presentation device, crediting a first portion of the time period for the media presentation device to first media based on the characterization, obtaining an on/off state of the media presentation device for a second portion of the time period different than the first portion, the on/off state being based on the ambient audio, and crediting the second portion of the time period based on the on/off state of the media presentation device. In some examples, obtaining the characterization includes accessing a digital signature in a data file received from the media presentation device. Some example methods further include comparing the characterization to a reference characterization, wherein crediting the first portion is based on the comparison.

Some disclosed example apparatus include a processor and a memory. The example memory stores computer readable instructions which, when executed, cause the processor to access a characterization of ambient audio, the ambient audio being recorded during a time period in a location including a media presentation device, credit a first portion of the time period for the media presentation device to first media based on the characterization, access an on/off state of the media presentation device for a second portion of the time period different than the first portion, the on/off state being based on the ambient audio, and credit the second portion of the time period based on the on/off state of the media presentation device. In some examples, the instructions are to cause the processor to access the characterization from a data file received from the media presentation device. In some examples, the instructions are further to cause the processor to compare the characterization to a reference characterization, wherein crediting the first portion is based on the comparison.

Referring to FIG. 1, a media content provider 102 provides content to an audience via one or more information presentation devices, such as a set top box 104 and a television 106. The components of the media presentation system may be coupled in any manner. In the illustrated example, the television 106 is positioned in a monitored area 120 located within a household occupied by one or more people, represented by a person 122, some or all of whom have agreed to participate in an audience measurement research study. The monitored area 120 includes the area in which the television 106 is located and from which the one or more household member(s) 122 located in the monitored area 120 may view the television 106.

The media content provider 102 may convey the media content to a metered household 120 via a cable network, a radio transmitter or one or more satellites. For example, the media content provider 102 may be a cable television provider distributing the television programs exclusively via a cable network or a satellite provider distributing media via satellite. The media content provider 102 may transmit media signals in any suitable format, such as a National Television Standards Committee (NTSC) television signal format, a high definition television (HDTV) signal format, an Association of Radio Industries and Businesses (ARIB) television signal format, etc.

In the example of FIG. 1, an audience measurement system 100 is used to collect audience measurement data concerning media activity associated with the metered household. A metered household may include one or more monitored areas 120. To this end, the audience measurement system 100 includes an audience measurement device 108 to collect media presentation information associated with one or more media device(s) (e.g., the set top box 104 and the television 106) in the monitored area 120. In the example of FIG. 1, the audience measurement device 108 collects presentation information including ambient audio (e.g., via one or more microphones) and/or audience member identification (e.g., via audience member log-ins and/or audience member prompt suppression). The audio recorded via the microphone(s) of the example audience measurement device 108 may include ambient audio signals from the monitored media presentation device (e.g., the television 106) and/or background noise from within the monitored area 120. For example, the ambient audio may comprise audio signal(s) reflecting humanly audible and/or humanly inaudible sounds within the household recorded via microphone(s) coupled to or included in the audience measurement device 108. Additionally or alternatively, the audience measurement device 108 may collect information including signals (e.g., infrared, radio frequency, etc.) generated by a remote control device 112.

The example audience measurement device 108 of FIG. 1 provides the presentation information, which may include recorded or captured audio, detected codes associated with the ambient audio, digital signatures representative of the ambient audio, tuning and/or demographic information, etc. for evaluation in a back office 130. In some examples, the audience measurement device 108 processes captured audio information to generate the presentation information. In some other examples, the audience measurement device transmits the captured audio to the back office 130 for processing. In the example of FIG. 1, the audience measurement device 108 transmits the presentation information via a data return path, such as cellular communications and/or wireless data communications, to the back office 130 for evaluation.

In the example of FIG. 1, the information collected by the audience measurement device 108 is processed and/or stored in the back office 130 to produce ratings information. The example back office 130 of FIG. 1 includes a media creditor 132 to credit the television 106, the monitored area 120, and/or the person 122 with media presentation. The media creditor 132 and the audience measurement device 108 of FIG. 1 cooperate to identify codes or watermarks embedded in the ambient audio, generate signatures of the ambient audio, compare the generated signatures with reference signatures of known media, and/or determine whether the media presentation device is in an on state or an off state based on the ambient audio. Based on these factors, the example media creditor 132 credits the media presentation device 106, the monitored area 120, and/or the person 122 during the time period represented by the ambient audio with media.

Figure 2:
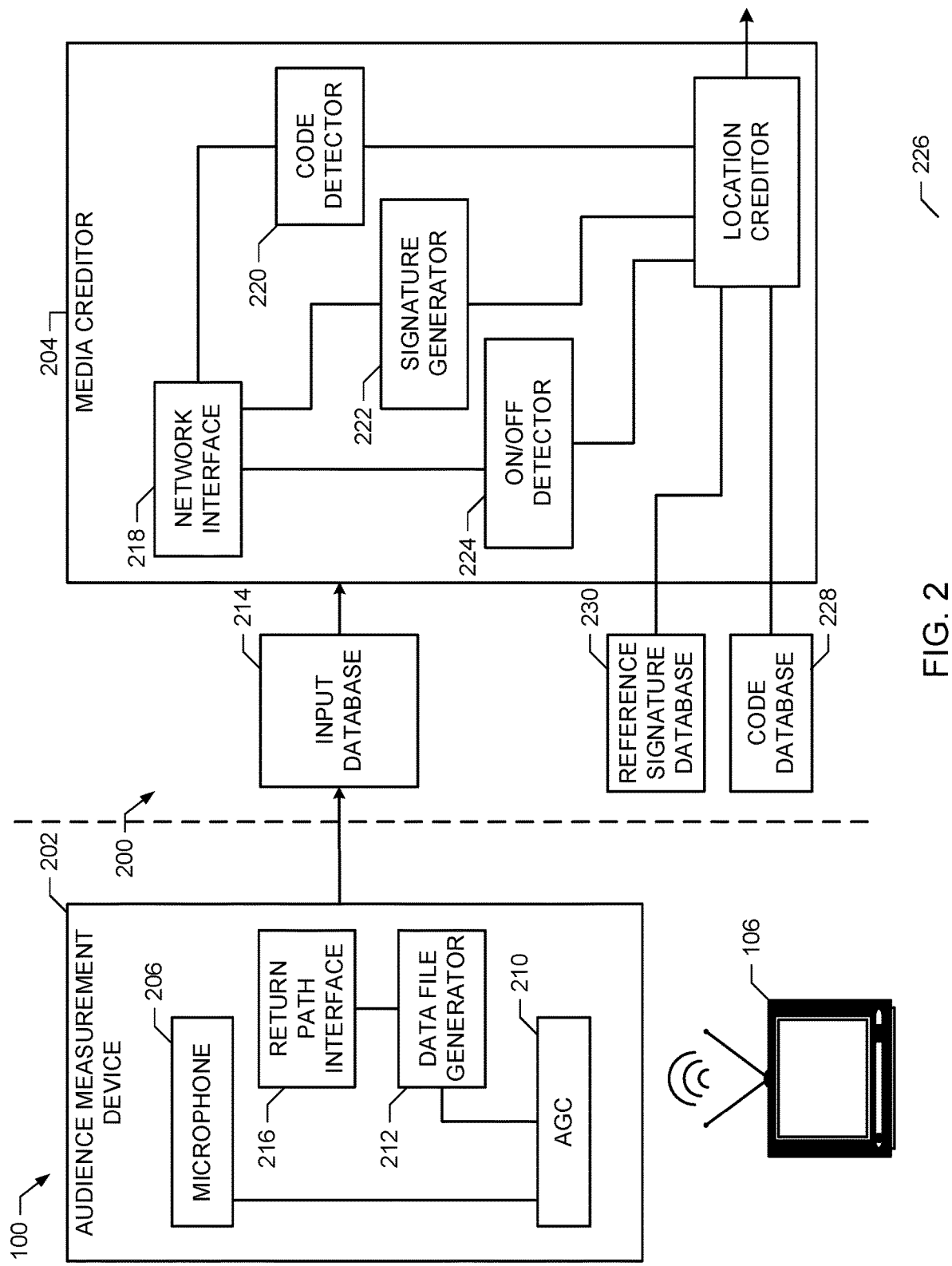
FIG. 2 is a block diagram of an example audience measurement device in communication with an example media creditor as illustrated in FIG. 1.

FIG. 2 is a block diagram of an example audience measurement device 202 in communication with an example media creditor 204 to implement the audience measurement system 100 of FIG. 1. The example audience measurement device 202 of FIG. 2 may be used to implement the audience measurement device 108 and the example media creditor 204 of FIG. 2 may be used to implement the media creditor 132 at the back office 130 of FIG. 1.

The example audience measurement device 202 of FIG. 2 includes one or more microphones 206, an automatic gain controller 210, and a data file generator 212. The example microphone 206 records ambient audio from a location within which the audience measurement device 202 is located. For example, the audience measurement device 202 may be configured such that the microphone 206 reliably captures audio output from a media presentation device (e.g., the presentation device 106 of FIG. 1) to be monitored.

The example automatic gain controller (AGC) 210 of FIG. 2 receives the captured audio signals and applies an automatic gain algorithm to boost the signal levels based on the level (e.g., energy, amplitude) of the input signal. The example AGC 210 outputs the boosted signals and the amount of gain applied to the data file generator 212. The example data file generator 212 of FIG. 2 generates a data file that includes the captured audio. In some examples, the data file further includes an indication of the gain applied by the AGC 210. The example data file generator 212 includes time stamps corresponding to the captured audio and/or to the gain levels to enable correlation of the audio with particular times (e.g., to credit the media presentation device with media presentation for the proper time periods).

The example data file generator 212 outputs the data file to an input database 214 via a return path interface 216. The example input database 214 of FIG. 2 obtains data files from multiple audience measurement devices for retrieval and processing by the media creditor 204. The example return path interface 216 of FIG. 2 may include any type of communications interface, such as a cellular radio or wireless local area network (WLAN) radio. In the example of FIG. 2, the return path interface 216 communicates with the input database 214 via a cellular data connection to an Internet protocol (IP) network to reduce or eliminate any dependency of the return path to the media creditor 304 on WLAN infrastructure of the location being monitored.

The example media creditor 204 of FIG. 2 obtains the data file including captured ambient audio from the monitored area 120 (e.g., from the input database 214, from the data file generator 212) via a network interface 218 and credits the monitored location associated with the audience measurement device 202 (e.g., the monitored location 120 of FIG. 1). To accurately credit the location based on the data file, the example media creditor 204 includes a code detector 220, a signature generator 222, an on/off detector 224, and a location creditor 226. The network interface 218 provides the received data file to each of the example code detector 220, the example signature generator 222, and the example on/off detector 224 to process the data file (e.g., process the audio).

The example code detector 220 of FIG. 2 detects embedded codes (e.g., steganographically embedded codes, watermarks, and/or other auxiliary data) present in the captured audio in the data file. The embedded codes may include information describing the media being presented, the channel being watched, and/or other audience measurement information. The example code detector 220 outputs the detected codes to the location creditor 226 to credit the media presentation device 106 with the media identified in the code(s).

The example code detector 220 may use any method(s) for detecting codes embedded in audio for audience measurement. In some cases, multiple embedded codes are present in a given block of audio and may be extracted using different techniques. Examples of techniques that may be used to extract embedded codes (e.g., watermarks) from the audio are described in U.S. patent application Ser. No. 12/249,619, assigned to The Nielsen Company (US), LLC, filed on Oct. 10, 2008; in U.S. patent application Ser. No. 12/361,991, assigned to The Nielsen Company (US), LLC, filed on Jan. 29, 2009; in U.S. Pat. No. 6,421,445, assigned to Arbitron Inc., issued on Jul. 16, 2002; and/or in U.S. Pat. No. 6,272,176, assigned to The Nielsen Company (US), LLC, issued on Aug. 7, 2001. The methods described in these patents and applications are merely examples, and any other method(s) may be used in addition and/or as an alternative to these methods.

The extracted embedded codes or watermarks may be identified using a code database 228 including a library of codes. In some examples, the codes in the code database 228 include information identifying media into which the codes have been inserted or embedded. The example location creditor 226 may determine whether an extracted code corresponds to a code that has been inserted into audio by querying the code database 228 for the extracted code. If the extracted code (or a code within an error range of the extracted code) is found, the example location creditor 226 may identify the extracted code as corresponding to the media of the code in the code database 228.

The example signature generator 222 generates signatures of the captured audio in the data file. The generated signatures may be compared to reference signatures to match the audio to known media. The example media creditor 204 of FIG. 2 receives the reference signatures from a reference signature database 230. Signature matching may be used to credit media presentation to portions of time in which embedded codes are not detected and/or are not recognizable.

The example signature generator 222 may use any method(s) for characterizing audio (e.g., generating signatures of audio) and/or comparing generated signatures to reference signatures. In some cases, multiple signatures using different techniques. Examples of techniques that may be used to extract embedded codes (e.g., watermarks) from the audio are described in U.S. Pat. No. 8,060,372, assigned to The Nielsen Company (US), LLC, issued on Nov. 15, 2011; in U.S. patent application Ser. No. 12/110,951, assigned to The Nielsen Company (US), LLC, filed on Apr. 28, 2008; and/or U.S. patent application Ser. No. 12/266,380, assigned to The Nielsen Company (US), LLC, filed on Nov. 6, 2008. The methods described in these patents and applications are merely examples, and any other method(s) to generate signatures may be used in addition and/or as an alternative to these methods to implement the signature generator 222.

The example on/off detector 224 of FIG. 2 determines when the media presentation device 106 is in an on state and/or when the media presentation device 106 is in an off state during the time period represented by the audio in the data file. To determine the on state(s) and/or the off state(s), the example on/off detector 224 uses, for example, fuzzy logic, rules, or heuristics to make inferences regarding the on/off state of the media presentation device 106. In some examples, the on/off detector 224 determines the on/off state of the media presentation device 106 based only on the captured audio, where processing of the audio (e.g., gain levels, statistics of the audio) are considered to be based on the captured audio. For example, the on/off detector 224 may determine, for a given portion of the time period, whether the media presentation device 106 is in an on state or an off state based on the gain level applied by the AGC 210 and/or based on processing the audio, without measuring power drawn by the media presentation device 106. An example method to implement the on/off detector 224 of FIG. 2 is described in U.S. Pat. No. 8,180,712, assigned to The Nielsen Company (US), LLC, issued on May 15, 2012. However, other methods of audio-based on/off detection may additionally or alternatively be used.

The example location creditor 226 of FIG. 2 receives extracted codes (e.g., from the code detector 220), generated signatures representative of the audio (e.g., from the signature generator 222), and/or determinations of the on state periods and/or the off state periods of the media presentation device 106 (e.g., from the on/off detector 224). Based on the received codes, signatures, and determinations, the example location creditor 226 credits the media presentation device 106 with the appropriate media presentations during the time period represented by the data file.

In the example of FIG. 2, the location creditor 226 overrides determinations of an off state by the on/off detector 224 when extracted codes and/or matching signatures from the audio in the data file indicates that media being presented by the media presentation device 106 during a corresponding time. For example, the location creditor 226 may credit the time periods for which a code is extracted and for which matching signatures are found prior to crediting time periods based on on/off detection information.

The example location creditor 226 outputs the crediting information for the time period represented by the captured audio. The crediting information may be stored and/or aggregated with crediting information for other time periods and/or other audience measurement devices to, for example, generate ratings information.

Figure 3:
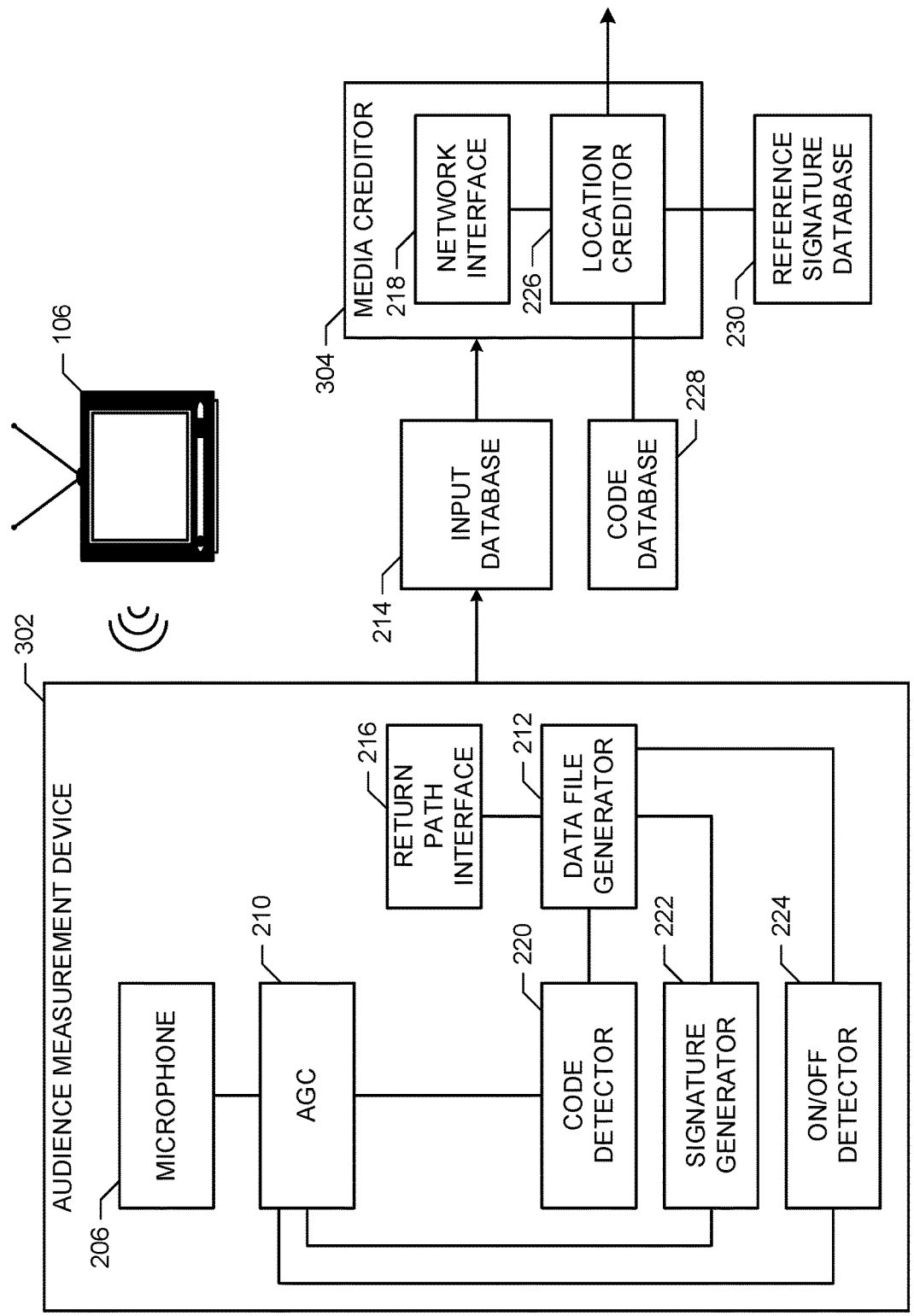
FIG. 3 is a block diagram of another example audience measurement device in communication with another example media creditor as illustrated in FIG. 1.

FIG. 3 is a block diagram of another example audience measurement device 302 in communication with another example media creditor 304 to implement the audience measurement system 100 of FIG. 1. The example audience measurement device 302 of FIG. 3 may be used to implement the audience measurement device 108 and the example media creditor 304 of FIG. 3 may be used to implement the media creditor 132 at the back office 130 of FIG. 1.

In contrast to the example audience measurement device 202 of FIG. 2, the example audience measurement device 302 of FIG. 3 generates a data file including extracted codes, generated signatures, and/or on/off detection information. The example media creditor 304 may then perform the crediting of the location based on the information received via the data file.

The example audience measurement device 302 of FIG. 3 includes one or more microphones 206, an AGC 210, a data file generator 212, a return path interface 216, a code detector 220, a signature generator 222, and an on/off detector 224. Because many of the elements of FIG. 3 are similar to elements in the example of FIG. 2, like reference numbers are used to refer to like elements. This numbering convention is employed throughout this description to reduce redundant description.

The example microphone 206 of FIG. 3 captures ambient audio from a media presentation device to be measured (e.g., the media presentation device 106 of FIG. 1). The microphone 206 outputs an electrical signal representative of the audio to the AGC 210, which applies a gain to the electrical signal based on the level (e.g., the energy, the amplitude, etc.) of the captured audio. In contrast to the AGC 210 of FIG. 2, which outputs the amplified signal and the gain level to the data file generator 212, the example AGC 210 of FIG. 3 outputs the audio and/or the gain level to the code detector 220, the signature generator 222, and the on/off detector 224. In some examples, the AGC 210 also provides the amplified signal to the data file generator 212 for inclusion (e.g., storage) in a data file generated by the data file generator 212.

The example data file generator 212 of FIG. 3 receives outputs from the example code detector 220, the example signature generator 222, and the example on/off detector 224. For example, the code detector 220 of FIG. 3 extracts codes embedded in the captured audio and provides the codes to the example data file generator 212. The example signature generator 222 of FIG. 3 generates signatures representative of the captured audio and provides the generated signatures to the example data file generator 212. The example on/off detector 224 of FIG. 3 determines periods of time during which the media presentation device 106 is in an on state and periods of time during which the media presentation device 106 is in on off state, and provides the determinations and/or the time periods to the example data file generator 212.

The example data file generator 212 of FIG. 3 generates a data file including extracted codes or watermarks, generated signatures, and/or on state and/or off state determinations for the media presentation device 106. As mentioned above, the example data file generator 212 may further include the captured audio and/or the gain levels. The audience measurement device 302 transmits the data file via the return path interface 216 to an input database 214, which stores the data file for retrieval by the media creditor 304.

The example media creditor 304 of FIG. 3 includes a network interface 218 and a location creditor 226. The example network interface 218 receives the data file from the input database 214 and/or from the return path interface 216. Based on the data file, the location creditor 226 credits the media presentation device 106 with media presentations based on the extracted codes, the generated signatures, and/or the on/off state determinations. In the example of FIG. 3, the location creditor 226 compares the generated signatures in the data file to signatures from a reference signature database 230 to identify media represented by the generated signatures. The example location creditor 226 outputs the crediting of the media presentation device 106 to, for example, generate television ratings information.

In the example of FIG. 3, the location creditor 226 first applies extracted codes (e.g., watermarks) in the data file to credit the media presentation device 106. For portions of a time period represented by the data file in which codes are not recognized, the example location creditor 226 of FIG. 3 determines whether the signatures corresponding to those portions match reference signatures. The example location creditor 226 of FIG. 3 credits the media presentation device 106 for the portions of the time period based on matching signatures. For portions of the time period that cannot be credited based on either codes or signatures (e.g., the remaining portions of the time period), the example location creditor 226 credits the media presentation device 106 using the determinations of the on states of the media presentation device 106 and the off states of the media presentation device 106.

While example manners of implementing the audience measurement system 100 of FIG. 1 have been illustrated in FIGS. 2 and 3, one or more of the elements, processes and/or devices illustrated in FIGS. 2 and/or 3 may be combined, divided, re-arranged, omitted, eliminated and/or implemented in any other way. Further, the example AGC 210, the example data file generator 212, the example input database 214, the example return path interface 216, the example network interface 218, the example code detector 220, the example signature generator 222, the example on/off detector 224, the example location creditor 226, the example reference signature database 230 and/or, more generally, the example audience measurement device 108, 202, 302 and/or the example media creditor 132, 204, 304 of FIGS. 1-3 may be implemented by hardware, software, firmware and/or any combination of hardware, software and/or firmware. Thus, for example, any of the example AGC 210, the example data file generator 212, the example input database 214, the example return path interface 216, the example network interface 218, the example code detector 220, the example signature generator 222, the example on/off detector 224, the example location creditor 226, the example reference signature database 230 and/or, more generally, the example audience measurement device 108, 202, 302 and/or the example media creditor 132, 204, 304 of FIGS. 1-3 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any of the apparatus or system claims of this patent are read to cover a purely software and/or firmware implementation, at least one of the example AGC 210, the example data file generator 212, the example input database 214, the example return path interface 216, the example network interface 218, the example code detector 220, the example signature generator 222, the example on/off detector 224, the example location creditor 226, the example reference signature database 230 of FIGS. 2 and/or 3 are hereby expressly defined to include a tangible computer readable medium such as a memory, DVD, CD, Blu-ray, etc. storing the software and/or firmware. Further still, the example audience measurement device 202, 302 and/or the example media creditor 204, 304 of FIGS. 2 and/or 3 may include one or more elements, processes and/or devices in addition to, or instead of, those illustrated in FIGS. 2 and/or 3, and/or may include more than one of any or all of the illustrated elements, processes and devices.

Figure 4:
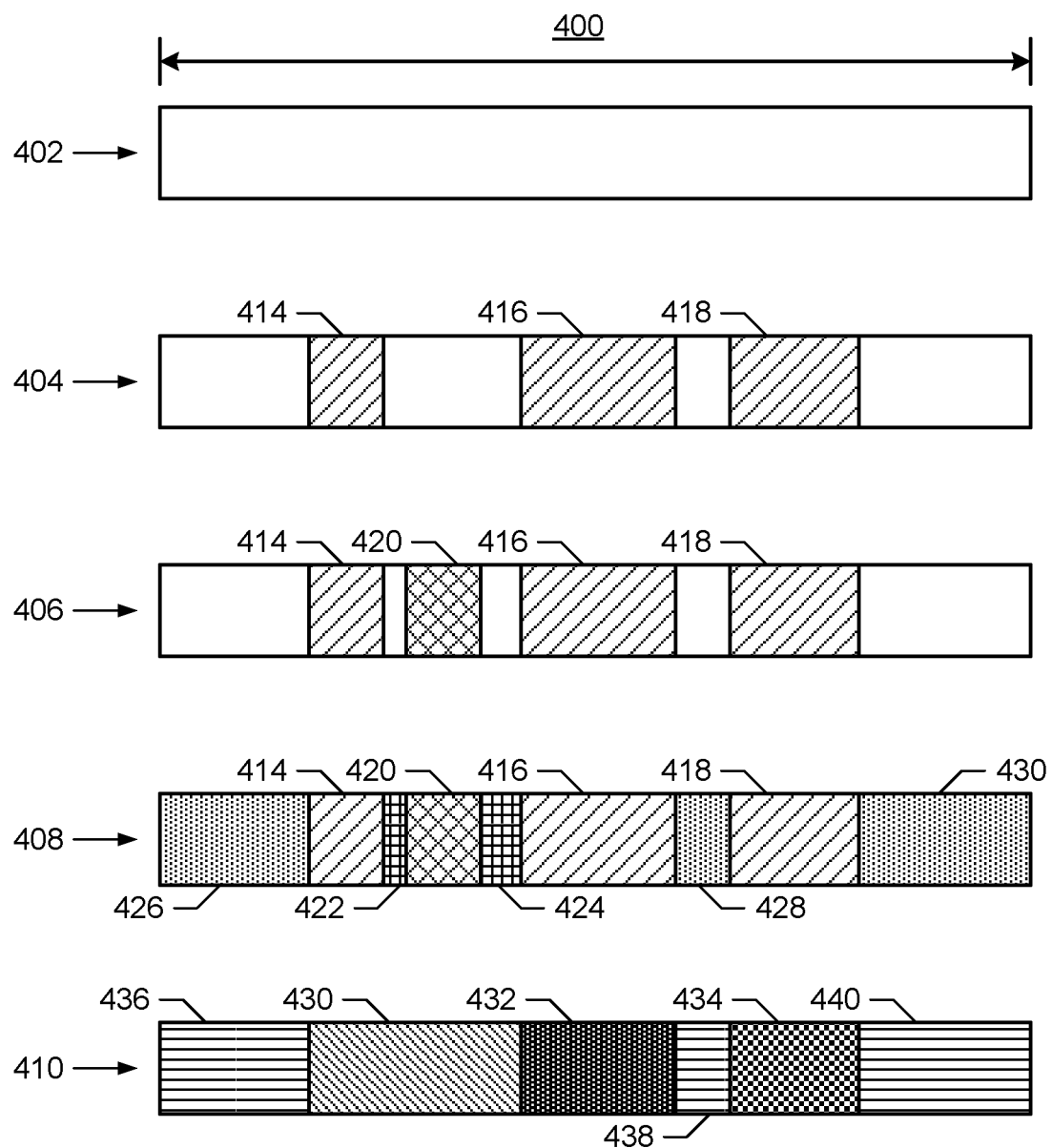
FIG. 4 illustrates a time period representative of crediting media presentations and/or non-presentations to a media presentation device during in an example process to perform crediting.

FIG. 4 illustrates a time period 400 representative of crediting media presentations and/or non-presentations to a media presentation device during in an example process to perform crediting. The example process of FIG. 4 includes a set of credited time periods 402-410 that may be performed using the audience measurement device 108, 202, 302 and/or the media creditor 132, 204, 304 of FIGS. 1-3. The example credited time periods 402-410 correspond to the same time period 400, which represents captured or recorded audio in a data file to be processed. The example time period 400 and the portions of the time period 400 discussed below are illustrative, and are not necessarily to scale. In the example of FIG. 4, different crosshatching is used to illustrate portions of the time period 400 that are credited using different techniques and do not necessarily represent different media.

In the example credited time period 402 of FIG. 4 the data file is yet to be processed and no part of the time period 400 has been credited. In the example credited time period 404, the example code extractor 220 and/or the example location creditor 226 of FIGS. 2 and/or 3 determine, based on the data file, that embedded codes were present in the captured audio during portions 414, 416, 418 of the time period 400. Accordingly, the example location creditor 226 credits the portions 414-418 with respective media presentations, while the remainder of the time period 400 in the credited time period 404 are not credited.

In the example credited time period 406 of FIG. 4, the example signature generator 222 and/or the example location creditor 226 of FIGS. 2 and/or 3 determine, based on generated signatures in the data file, that a portion 420 of the time period 400 corresponds to a media presentation. The example location creditor 226 of FIGS. 2 and/or 3 credits the portion 420 with media presentation (e.g., based on the reference signature to which the generated signature is matched). The remaining portions of the time period 400 that have not been credited based on codes or signature matching remain not credited at credited time period 406.

In the example credited time period 408, the example on/off detector 224 and/or the example location creditor 226 of FIGS. 2 and/or 3 determine, based on generated signatures in the data file, that portions 422, 424 of the time period 400 are to be credited as in an on state (e.g., presenting media) and portions 426, 428, 430 of the time period 400 are to be credited as in an off state (e.g., not presenting media). Therefore, after the example credited time period 408, the media presentation device 106 has been credited for the entire example time period 400 (e.g., based on particular media, not based on particular media, and/or in an off state).

In the example credited time period 410, the example location creditor 226 of FIGS. 2 and/or 3 determines the media with which the media presentation device 106 is to be credited during the time period 400. For example, while the portions 422, 424 in the credited time period 408 are initially credited as in an on state (and, therefore, presumably presenting media), the example location creditor 226 may determine the media being presented during the portions based on, for example, continuity of audio with portions 414, 416, and/or 420 adjacent to the portions 422 and/or 424. In some examples, if the portions 422 and/or 424 are sufficiently brief and the portions adjacent the portions 422, 424 represent identical media, the location creditor 226 may assume that the portions 422 and/or 424 represent the same media as the adjacent portion(s). Any other appropriate assumptions may be used to credit the portions 422, 424 that correspond to an on state of the media presentation device 106.

In the example credited time period 410 of FIG. 4, the location creditor 226 credits contiguous portion 430, contiguous portion 432, and contiguous portion 434 with different media. The example location creditor 226 credits the portions 436, 438, and 440 with an off state representative of media not being presented by the media presentation device 106.

In some other examples, the audio may be provided for the portions 422, 424 for further analysis to determine the media being presented during the portions 422, 424. Such analysis may include applying additional signaturing techniques and performing comparisons of the signatures and/or enabling a human to listen to the audio to determine whether the audio corresponds to the same media as adjacent portions 414, 416, and/or 420.

While the example credited time periods 402-410 of FIG. 4 are shown in a particular order, other sequences of crediting may be used. For example, the location creditor 226 of FIGS. 2 and/or 3 may credit the on states and/or the off states of the media presentation device 106 and subsequently override the on states and/or the off states with crediting of media based on extracted codes and/or signaturing.

Figure 5:
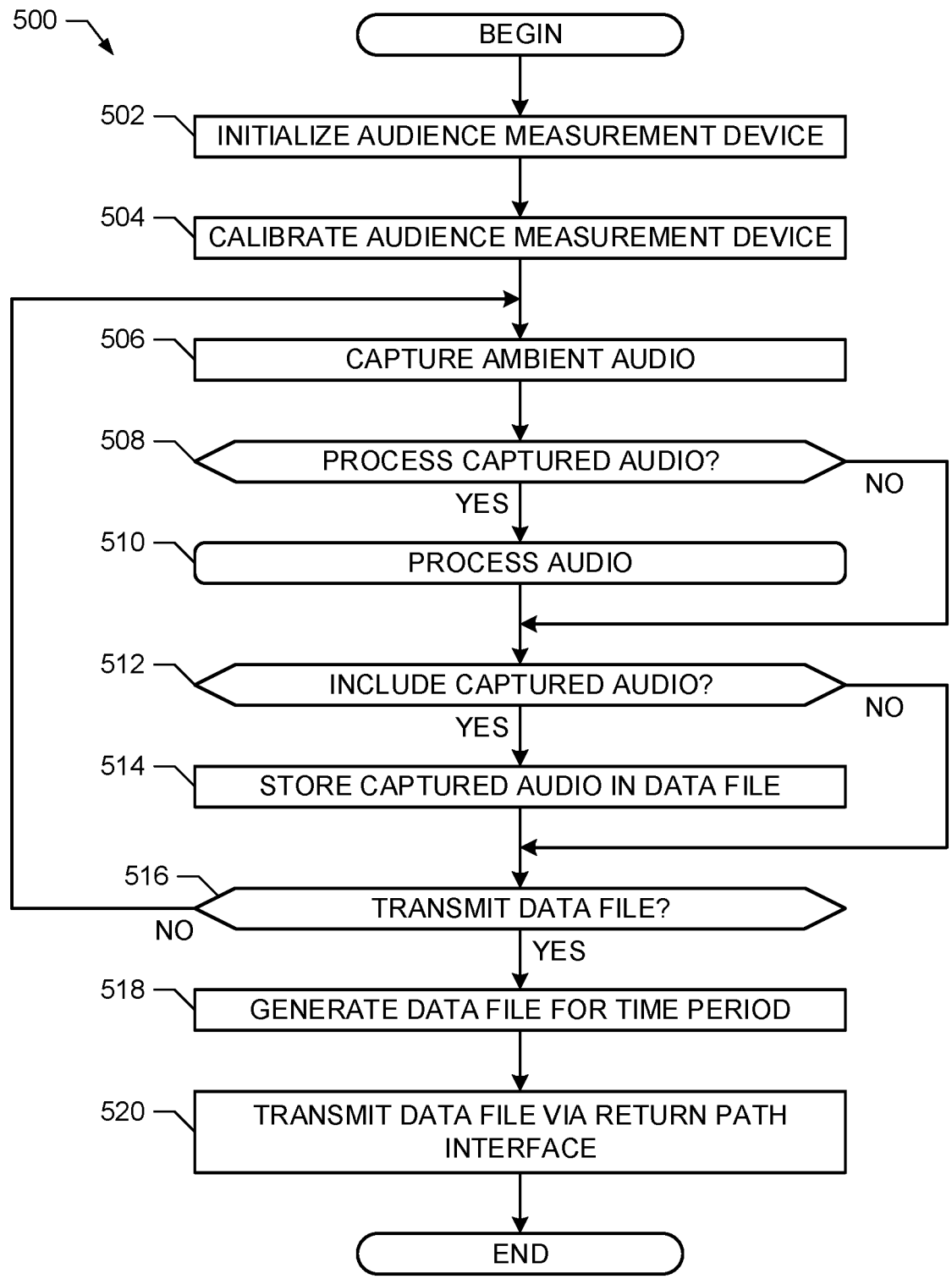
FIG. 5 is a flowchart representative of example machine readable instructions that may be executed to implement the example audience measurement device of FIGS. 1-3.
Figure 6:
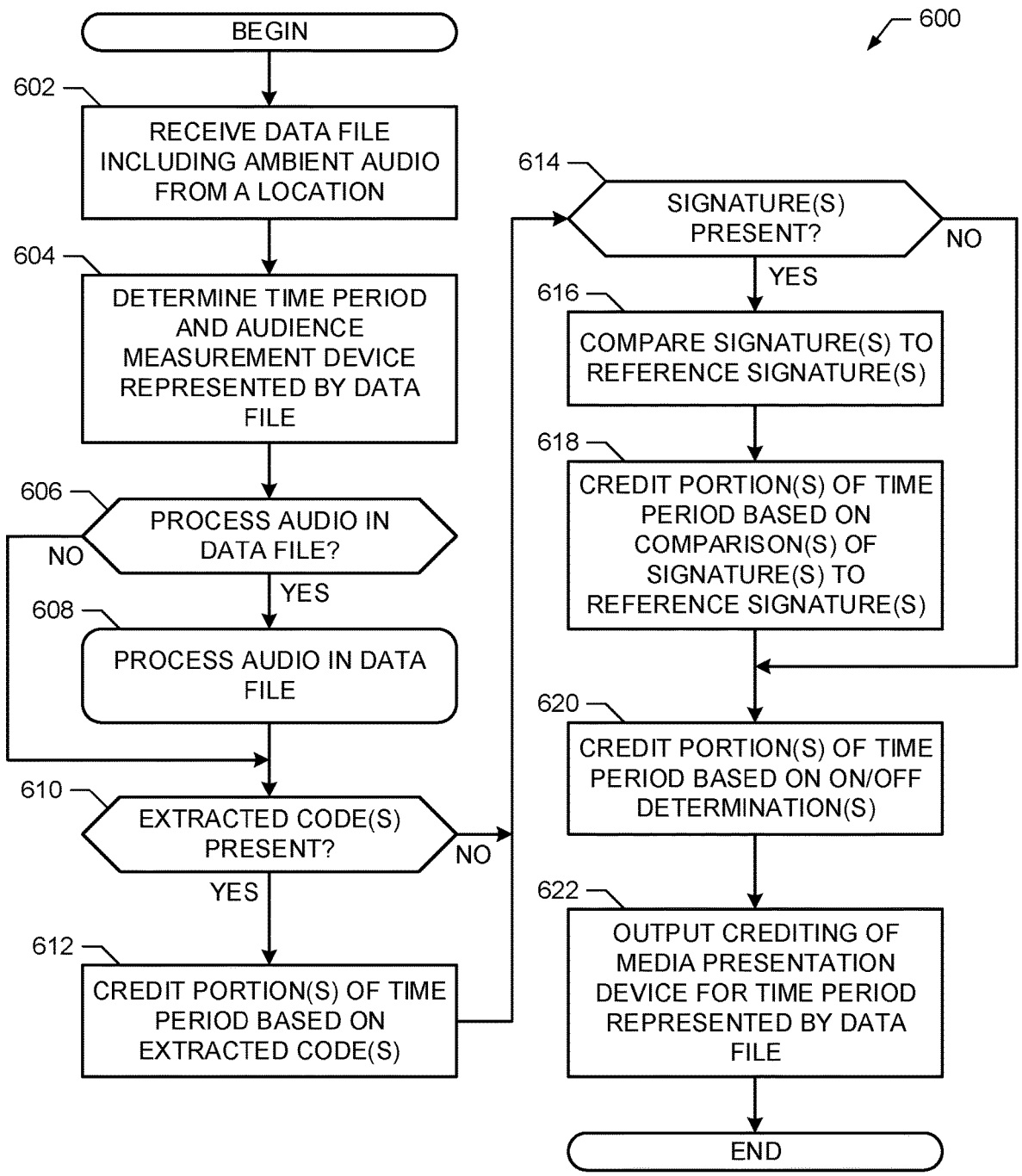
FIG. 6 is a flowchart representative of example machine readable instructions that may be executed to implement the example media creditor of FIGS. 1-3.
Figure 7:
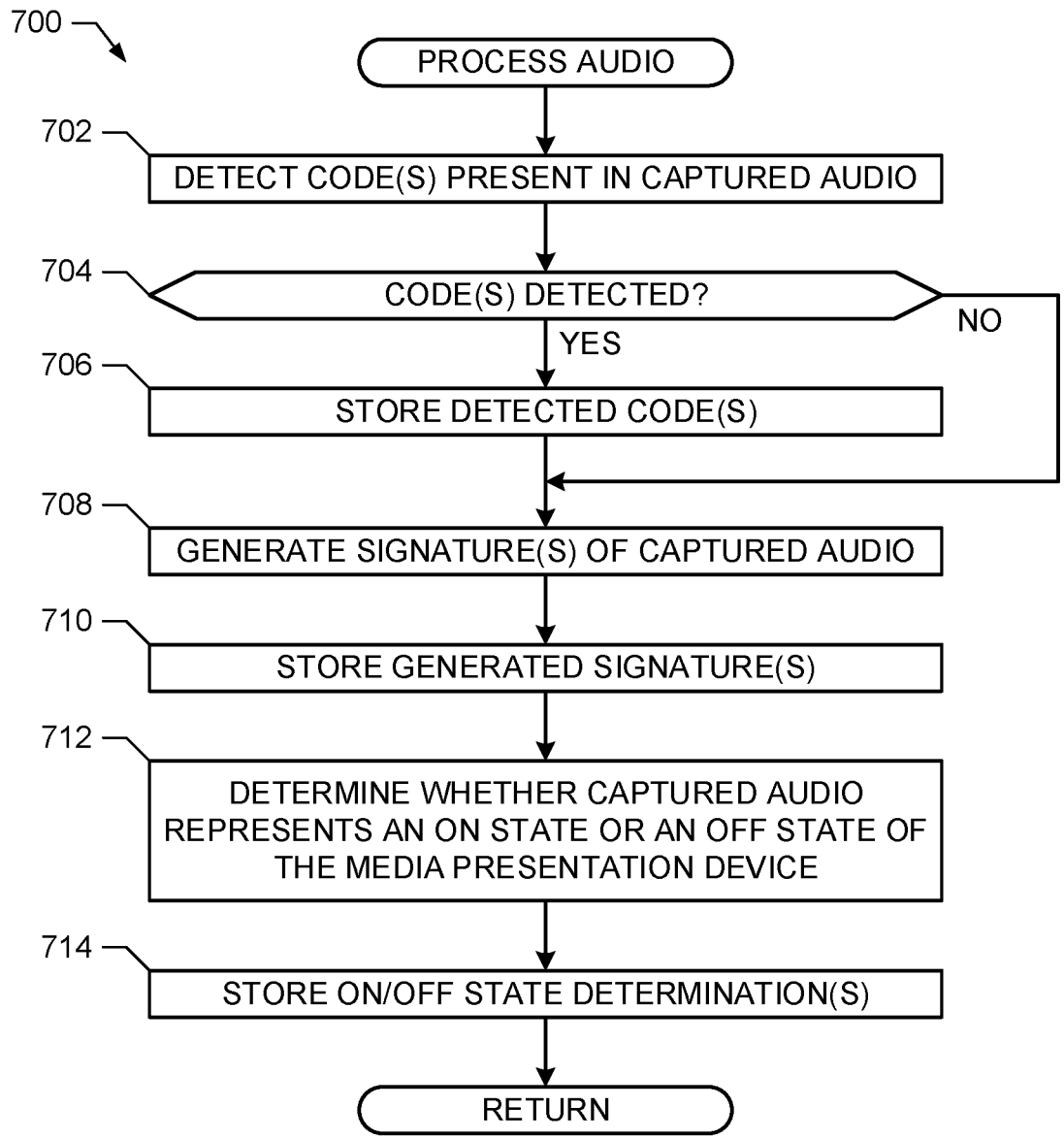
FIG. 7 is a flowchart representative of example machine readable instructions that may be executed to implement the example media creditor and/or the example audience measurement device of FIGS. 1-3 to process captured audio.

Flowcharts representative of example machine readable instructions for implementing the example AGC 210, the example data file generator 212, the example input database 214, the example return path interface 216, the example network interface 218, the example code detector 220, the example signature generator 222, the example on/off detector 224, the example location creditor 226, the example reference signature database 230 and/or, more generally, the example audience measurement device 108, 202, 302 and/or the example media creditor 132, 204, 304 of FIGS. 1-3 are shown in FIGS. 5-7. In this example, the machine readable instructions comprise program(s) for execution by a processor such as the processor 812 shown in the example processor platform 800 discussed below in connection with FIG. 8. The program(s) may be embodied in software stored on a tangible computer readable medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program is described with reference to the flowcharts illustrated in FIGS. 5-7 many other methods of implementing the example AGC 210, the example data file generator 212, the example input database 214, the example return path interface 216, the example network interface 218, the example code detector 220, the example signature generator 222, the example on/off detector 224, the example location creditor 226, the example reference signature database 230 and/or, more generally, the example audience measurement device 108, 202, 302 and/or the example media creditor 132, 204, 304 of FIGS. 1-3 may alternatively be used. For example, the order of execution of the blocks may be changed, and/or some of the blocks described may be changed, eliminated, or combined.

The example instructions 500-700 of FIGS. 5, 6, and/or 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage device or storage disc (e.g., a magnetic storage disc, an optical storage disc) and to exclude propagating signals. Additionally or alternatively, the example processes of FIGS. 5, 6, and/or 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc (e.g., a magnetic storage disc, an optical storage disc) and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 is a flowchart representative of example machine readable instructions 500 that may be executed to implement the example audience measurement devices 108, 202, 302 of FIGS. 1-3. The example instructions 500 may be executed to generate a data file for transmission via a return path to the example media creditors 116, 204, 304 of FIGS. 1-3. The instructions 500 of FIG. 5 will be described, by way of example, with reference to the example audience measurement device 302 of FIG. 3.

The example audience measurement device 302 initializes (block 502). For example, the audience measurement device 108 may determine a number and/or type of microphones 206, 208 for capturing audio and determine a reference time signal (e.g., from a cellular data connection via the return path interface 216). The example audience measurement device 302 is calibrated (block 504). For example, the audience measurement device 302 may be calibrated to an ambient audio level in a location in which the audience measurement device 302 is placed and/or may be calibrated to an audio level and/or audio range of a media presentation device 106 to be monitored via the audience measurement device 302. In some examples, calibration improves the accuracy of on/off state determinations.

The example audience measurement device 302 captures (e.g., records) ambient audio in the location (block 506). For example, the audience measurement device 302 captures audio output from the media presentation device 106 being monitored when the media presentation device 106 is playing audio.

The example audience measurement device 302 determines whether to process the captured audio (block 508). For example, the audience measurement device 302 may be enabled to extract codes or watermarks embedded in the captured audio, generate digital signatures representative of the captured audio, and/or determine whether the media presentation device 106 is in an on state or an off state based on the captured audio. If the audience measurement device 302 is to process the captured audio (block 508), the example audience measurement device 302 proceeds to process the audio (block 510). Example instructions to implement block 510 are described below with reference to FIG. 7.

After processing the audio (block 510), or if the audience measurement device 302 is to not process the audio (block 508), the example audience measurement device 302 determines whether to include the captured audio in the data file (block 512). If the audience measurement device 302 is to include the captured audio in the data file (block 512), the example audience measurement device 302 stores the captured audio in the data file (block 514). In some examples, the audience measurement device 302 includes the captured audio in the data file (block 514) when the audio is not processed by the audience measurement device 302 (block 508). In some examples, the audience measurement device 302 does not include the captured audio in the data file when the audience measurement device 302 processes the audio in the data file (e.g., includes extracted code(s), generated signature(s), and/or on/off determinations in the data file in block 510).

After storing the captured audio in the data file (block 514), or if the captured audio is not to be included (block 512), the example audience measurement device 302 determines whether the data file is to be transmitted (block 516). For example, the audience measurement device 302 may transmit the data file (e.g., from the data file generator 212 via the return path interface 216 of FIGS. 2 and/or 3) periodically, aperiodically, at particular times, in response to an event or condition (e.g., a local memory is filled), on request, and/or based on any other criteria. If the audience measurement device 302 is to not transmit the data file (block 516) (e.g., a measurement period has not yet elapsed), control returns to block 506 to continue capturing ambient audio.

When the audience measurement device 302 is to transmit the data file (block 516) (e.g., a time period has elapsed), the example data file generator 212 generates the data file corresponding to a time period (block 518). The generated data file may include the captured audio and/or any data resulting from processing the audio. The example data file generator 212 transmits the data file via the return path interface 216 (block 520). For example, the return path interface 216 may establish a cellular data connection to transmit the data file to the input database 214 and/or to the media creditor 304 of FIG. 3. The example instructions 500 may then end and/or iterate to capture audio for a subsequent measurement period. In some examples, iterating the instructions 500 may result in omitting blocks 502 and/or 504 for the subsequent iterations.

FIG. 6 is a flowchart representative of example machine readable instructions 600 that may be executed to implement the example media creditor 132, 204, 304 of FIGS. 1-3. The example instructions 600 may be executed to credit a media presentation device based on a data file. The instructions 600 of FIG. 6 will be described, by way of example, with reference to the example media creditor 204 of FIG. 2.

The example media creditor 204 receives a data file (e.g., from the audience measurement device 202 and/or the input database 214 of FIG. 2) (block 602). The example data file may include captured audio, gain levels for the AGC 210, codes or watermarks extracted from the audio, signatures representative of the audio, on/off determinations, time stamps, and/or identification data for the monitored location associated with the audience measurement device 202.

The example media creditor 204 (e.g., via the location creditor 226) determines a time period and an audience measurement device represented by the data file (block 604). For example, the location creditor 226 may determine that the data file corresponds to a predetermined time period (e.g., a particular day, a particular week, etc.) and/or may determine the time period based on a range of time stamps in the data file. The example location creditor 226 of FIG. 3 may determine the audience measurement device based on an identification of the audience measurement device 202 and/or an identification of the media presentation device 106 included in the data file.

The example location creditor 226 determines whether the audio in the data file is to be processed (block 606). In examples in which the audience measurement device 202 does not process the audio, the example location creditor 226 may determine that the audio is to be processed. For example, the location creditor 226 may determine whether signatures and/or on/off determinations are present or omitted from the data file, which may indicate whether the audience measurement device 202 performed processing on the captured audio.

For example, the media creditor 204 may be enabled to extract codes or watermarks embedded in the captured audio (e.g., via the code extractor 220 of FIG. 2), generate digital signatures representative of the captured audio (e.g., via the signature generator 222 of FIG. 2), and/or determine whether the media presentation device 106 is in an on state or an off state based on the captured audio (e.g., via the on/off detector 224 of FIG. 2). If the audience measurement device 302 is to process the captured audio (block 606), the example audience measurement device 302 proceeds to process the audio (block 608). Example instructions to implement block 608 are described below with reference to FIG. 7.

After processing the audio (block 608), or if the media creditor 204 is to not process the audio (block 606), the example media creditor 204 determines (e.g., via the location creditor 226) whether extracted code(s) are present (block 610). The location creditor 226 may determine whether code(s) are present in the data file and/or from processing the audio. If extracted codes are present (block 610), the example location creditor 226 credits the respective portion(s) of the time period represented by the data file based on the extracted code(s) (block 612). Crediting the portions of the time period may include, for example, associating media identified via the extracted codes with the media presentation device 106 for the portions of the time period.

After crediting based on the extracted code(s) (block 612), or if no extracted codes are present (block 610), the example location creditor 226 determines whether any signatures of the audio are present (block 614). The location creditor 226 may determine whether signatures(s) are present in the data file and/or from processing the audio. If signature(s) are present (block 614), the example location creditor 226 compares the signature(s) to reference signature(s) (block 616). The example location creditor 226 credits portion(s) of the time period represented by the data file based on the comparison(s) of the signature(s) to the reference signature(s) (block 618). For example, if a generated signature is considered to match a reference signature, the example location creditor 226 credits the portion of the time period associated with the generated signature (e.g., credits the media presentation device 106 with the media corresponding to the matched reference signature).

After crediting based on the comparison(s) of the signature(s) to reference signature(s) (block 618), or if there are no signatures present (block 614), the example location creditor 226 credits portion(s) of the time period based on determinations of on states of the media presentation device 106 and/or off states of the media presentation device 106 (block 620). For example, the location creditor 226 may use the on/off determinations to credit the portion(s) of the time period that were not credited using codes (block 612) and/or signatures (block 618). In some examples, the location creditor 226 further credits media to the media presentation device 106 for the portion(s) of the time period during which the media presentation device 106 is determined to be on.

The example location creditor 226 outputs the crediting of the media presentation device 106 for the time period represented by the data file (block 622). The crediting of the media presentation device 106 may be used to, for example, determine demographic information and/or generate television ratings information.

FIG. 7 is a flowchart representative of example machine readable instructions 700 that may be executed to implement the example media creditor 132, 204, 304 of FIGS. 1-3 and/or the example audience measurement device 108, 202, 302 of FIGS. 1-3 to process captured audio. The instructions 700 of FIG. 7 will be described, by way of example, with reference to the example media creditor 204 of FIG. 2.

The example instructions 700 of FIG. 7 may be executed in response to an audience measurement device (e.g., the audience measurement device 108, 202, 302 of FIGS. 1-3) and/or a media creditor (e.g., media creditor 132, 204, 304 of FIGS. 1-3). The example media creditor 204 (e.g., via the code extractor 220 of FIG. 2) detects code(s) present in the captured audio (block 702). The example code extractor 220 may use any method of detecting and/or extracting embedded codes, watermarks, and/or any other type of auxiliary information from the audio. The example code extractor 220 determines whether any codes are detected (block 704) and, if so, stores the detected code(s) (block 706). For example, the code extractor 220 may store the codes in association with the data file for later crediting of the time period represented by the data file. The example code extractor 220 of FIG. 2 may further store a timestamp corresponding to a time or a range of time represented by the data file at which each particular code was detected.

After storing the detected code(s) (block 706), or if no codes are detected in the audio (block 704), the example media creditor 204 (e.g., via the signature generator 222 of FIG. 2) generates signature(s) of the captured audio (block 708). The example signature generator 222 may use any method of digitally characterizing the captured audio. In some examples, the signature generator 222 generates multiple signatures to characterize the time period of the data file. In some examples, the signature generator 222 also generates multiple signatures of identical or overlapping portions of the time period to perform one or more characterization or signaturing methods. The example signature generator 222 stores the generated signature(s) (block 710). For example, the signature generator 222 may store the generated signature(s) in association with the data file for later crediting of the time period represented by the data file.

The example signature generator 222 of FIG. 2 may further store time stamp(s) corresponding to time(s) and/or range(s) of time represented by the data file that are characterized by each of the generated signature(s).

The example media creditor 204 (e.g., via the on/off detector 224) determines whether the captured audio represents an on state or an off state of the media presentation device 106 for the time periods represented by the data file (block 712). For example, the on/off detector 224 may analyze portions of the audio and/or other data, such as gain levels applied to captured audio by the AGC 210, to determine at what times the media presentation device 106 was in an on state and at what times the media presentation device 106 was in an off state during the time period represented by the data file. The example on/off detector 224 stores the on/off determination(s) (block 714). For example, the on/off detector 224 may store the on/off determinations in association with the data file for later crediting of the time period represented by the data file.

The example instructions 700 may then end and control returns to block 512 of FIG. 5 or block 610 of FIG. 6.

Figure 8:
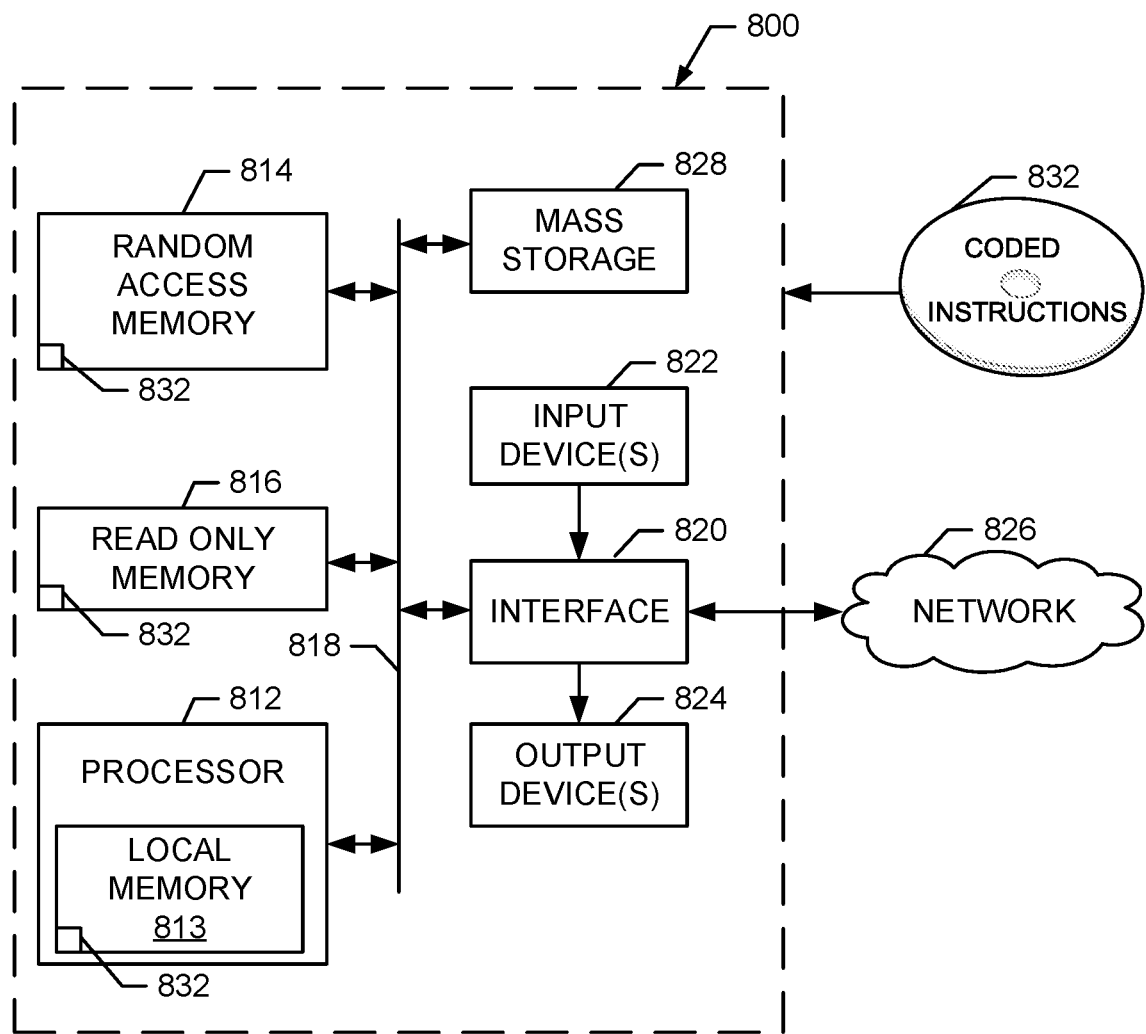
FIG. 8 is a block diagram of an example processor system that may be used to execute the example machine readable instructions of FIGS. 5-7 to implement the example audience measurement devices and/or the example media creditors of FIGS. 1-3.

FIG. 8 is a block diagram of an example processor platform 800 capable of executing the instructions of FIGS. 5-7 to implement the example audience measurement device 108, 202, 302 and/or the example media creditor 132, 204, 304 of FIGS. 1, 2, and/or 3. The processor platform 800 can be, for example, a server, a personal computer, or any other type of computing device.

The processor platform 800 of FIG. 8 includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.). The example interface circuit 820 may implement the return path interface 216 and/or the network interface 218 of FIGS. 2 and/or 3.

The processor platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the input database 214 of FIGS. 2 and/or 3.

The coded instructions 832 of FIGS. 5-7 may be stored in the mass storage device 828, in the volatile memory 814, in the non-volatile memory 816, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
    a signature generator to compute a signature from audio obtained from a media device during a time period;
    an on/off detector to determine an on/off state of the media device based on a gain level applied by an automatic gain controller during collection of the audio;
    a location creditor to credit the media device with presenting media during the time period when the signature matches at least one of a set of reference signatures and the on/off state determined for the media device is an on state, and when the signature matches at least one of the set of reference signatures and the on/off state determined for the media device is an off state; and
    the location creditor not to credit the media device with presenting the media during the time period when the signature does not match at least one of the set of reference signatures and the on/off state determined for the media device is the off state.

2. The apparatus as defined in claim 1, wherein the audio is recorded with a microphone at a monitored location.

3. The apparatus as defined in claim 1, wherein the audio is included in a data file received from the media device.

4. The apparatus as defined in claim 1, wherein the signature generator generates multiple signatures for the time period.

5. The apparatus as defined in claim 1, further including a code detector to detect encoded information present in the audio obtained for the time period when the signature does not match at least one of the set of reference signatures, the location creditor to credit the media device with presenting media during the time period when the code detector detects the encoded information irrespective of the determination of the on/off state, and the location creditor not to credit the media device with presenting the media during the time period when the code detector does not detect the encoded information and the on/off state determined for the media device is the off state.

6. The apparatus as defined in claim 5, wherein the code detector is to detect the encoded information based on extracting a steganographically encoded watermark from the audio.

7. A tangible computer readable storage medium comprising computer readable instructions which, when executed, cause a processor to at least:
    compute a signature from audio obtained from a media device during a time period;
    determine an on/off state of the media device based on a gain level applied by an automatic gain controller to collect the audio;
    credit the media device with presenting media during the time period when the signature matches at least one of a set of reference signatures and the on/off state determined for the media device is an on state, and when the signature matches at least one of the set of reference signatures and the on/off state determined for the media device is an off state; and
    not crediting the media device with presenting the media during the time period when the signature does not match at least one of the set of reference signatures and the on/off state determined for the media device is the off state.

8. The storage medium as defined in claim 7, wherein the instructions further cause the processor to obtain the audio by recording an audio signal sensed by a microphone.

9. The storage medium as defined in claim 7, wherein the instructions further cause the processor to obtain the audio by receiving a data file including the audio from the media device.

10. The storage medium as defined in claim 7, wherein the instructions further cause the processor to generate multiple signatures for the time period.

11. The storage medium as defined in claim 7, wherein the instructions further cause the processor to:
    when the signature does not match at least one of the set of reference signatures, (1) detect encoded information present in the audio obtained for the time period, (2) credit the media device with presenting media during the time period when the encoded information is detected irrespective of the determination of the on/off state, and (3) not credit the media device with presenting the media during the time period when the encoded information is not detected and the on/off state determined for the media device is the off state.

12. The storage medium as defined in claim 11, wherein the instructions further cause the processor to detect the encoded information by extracting a steganographically encoded watermark from the audio.

13. A method comprising:
    computing, by executing an instruction with a processor, a signature from audio obtained from a media device during a time period;
    determining, by executing an instruction with the processor, an on/off state of the media device based on a gain level applied by an automatic gain controller to collect the audio; and
    crediting, by executing an instruction with the processor, the media device with presenting media during the time period when the signature matches at least one of a set of reference signatures and the on/off state determined for the media device is an on state, and when the signature matches at least one of the set of reference signatures and the on/off state determined for the media device is an off state; and
    not crediting the media device with presenting the media during the time period when the signature does not match at least one of the set of reference signatures and the on/off state determined for the media device is the off state.

14. The method as defined in claim 13, further including obtaining the audio by recording the audio with a microphone at a monitored location.

15. The method as defined in claim 13, further including obtaining the audio by receiving a data file including the audio from the media device.

16. The method as defined in claim 13, further including computing multiple signatures for the time period.

17. The method as defined in claim 13, further including:
when the signature does not match at least one of the set of reference signatures, (1) detecting if encoded information is present in the audio obtained for the time period, (2) crediting the media device with presenting media during the time period when the encoded information is detected irrespective of the determination of the on/off state, and (3) not crediting the media device with presenting the media during the time period when the encoded information is not detected and the on/off state determined for the media device is the off state.

18. The method as defined in claim 17, wherein the detecting of the encoded information includes extracting a steganographically encoded watermark from the audio.

* * * * *